United States Patent
Martin

(10) Patent No.: US 9,595,278 B1
(45) Date of Patent: Mar. 14, 2017

(54) HIGH FREQUENCY REFERENCE PATTERNS USED TO DETERMINE HEAD-TO-MEDIA CLEARANCE

(71) Applicant: Seagate Technology LLC, Cupertino, CA (US)

(72) Inventor: Richard Edward Martin, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/925,087

(22) Filed: Oct. 28, 2015

(51) Int. Cl.
  *G11B 21/02* (2006.01)
  *G11B 5/60* (2006.01)
  *G11B 20/18* (2006.01)

(52) U.S. Cl.
  CPC ......... *G11B 5/6029* (2013.01); *G11B 20/182* (2013.01)

(58) Field of Classification Search
  None
  See application file for complete search history.

(56) References Cited

U.S. PATENT DOCUMENTS

| | | | |
|---|---|---|---|
| 7,038,875 B2 | 5/2006 | Lou et al. | |
| 7,835,104 B2 | 11/2010 | Yamashita et al. | |
| 7,852,581 B2* | 12/2010 | Saito | G11B 5/6005 360/31 |
| 8,059,357 B1* | 11/2011 | Knigge | G11B 5/6011 360/75 |
| 8,649,119 B2 | 2/2014 | Marchon et al. | |
| 8,773,802 B1* | 7/2014 | Anderson | G11B 5/6029 360/55 |
| 9,001,451 B1* | 4/2015 | Martin | G11B 21/21 360/75 |

* cited by examiner

Primary Examiner — K. Wong
(74) Attorney, Agent, or Firm — Hollingsworth Davis, LLC

(57) ABSTRACT

A test track is written to a recording medium and includes a repeated series of reference patterns. The reference patterns each include a first portion with a high frequency pure tone and a second portion with a higher frequency component. A length of the first portion is greater than a length of the second portion. The series of reference patterns are read to determine first and second harmonic amplitudes, and a head-to-media clearance is determined based on the first and second amplitudes at first and second harmonic frequencies.

20 Claims, 6 Drawing Sheets

HIGH FREQUENCY REFERENCE PATTERNS USED TO DETERMINE HEAD-TO-MEDIA CLEARANCE

SUMMARY

The present disclosure is directed to a method, system, and apparatus used to determine head-to-media clearance. In one embodiment, a test track that is written to a recording medium includes a repeated series of reference patterns. The reference patterns each include a first portion with a high frequency pure tone and a second portion with a higher frequency component. A length of the first portion is greater than a length of the second portion. The series of reference patterns are read to determine first and second harmonic amplitudes, and a head-to-media clearance is determined based on the first and second amplitudes at first and second harmonic frequencies.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic data storage devices such as hard disk drives. A hard disk drive utilizes a magnetic read/write head to record data to and read data from a magnetic disk. The read/write head (also referred to as a slider) is held close to the disk without touching the disk. A bottom surface of the read/write head is configured as an air bearing surface (ABS) that causes the read/write head to be separated from the disk by a thin layer of air. The read/write head may include other features (described below) that facilitate finely controlling the spacing between transducers of the read/write head to account for surface irregularities or other imperfections that could result in non-optimal spacing and/or head-to-disk contact.

As the areal density of modern perpendicular media has increased, the head-to-media clearances have decreased. This is due at least in part to the reduced magnetic flux produced by the smaller bit regions. Decreasing the head-to-media clearance increases the sensitivity of the read transducer, enabling it to better read the smaller bits. However, maintaining these decreased clearances requires measurement of clearance with increasing levels of accuracy and reliability. In the present disclosure, apparatuses and methods are described that increase the reliability and accuracy of clearances determined based on harmonic ratio (HR) measurements.

Figure 1:
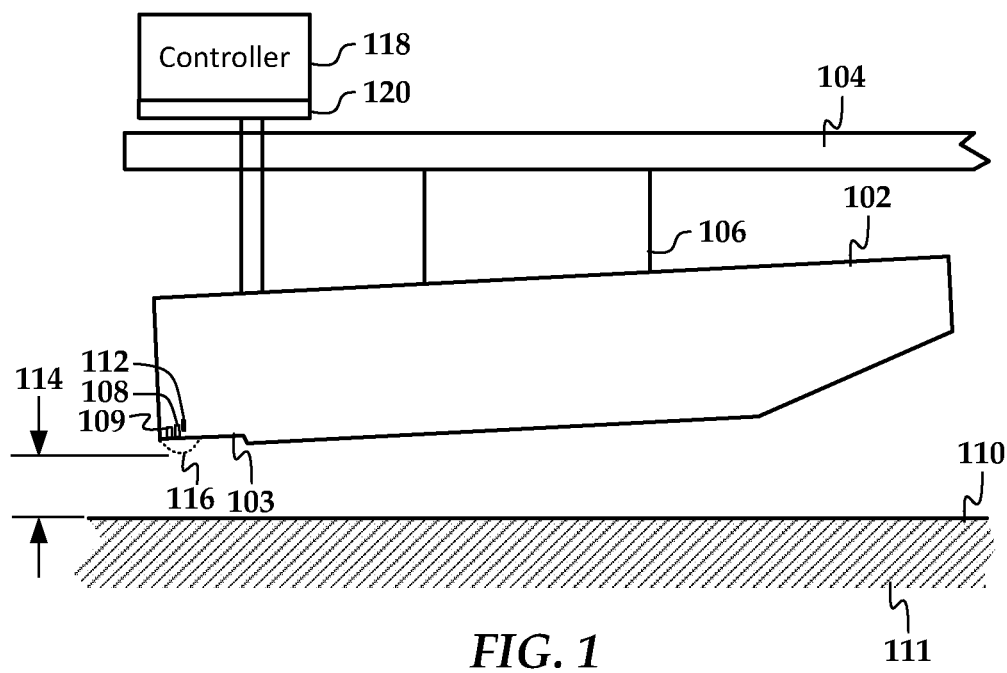
FIG. 1 is a block diagram of a read/write head and recording medium according to an example embodiment.

In FIG. 1, a diagram illustrates a read/write head 102 and magnetic recording medium 111 (e.g., magnetic disk) used in performing HR measurements as described below. The read/write head 102 may also be referred to herein as a slider, read head, recording head, write head, etc. The read/write head 102 is coupled to an arm 104 by way of a suspension 106. The read/write head 102 includes at least one read transducer 108 and at least one write transducer 109 at a media-facing surface 103, e.g., ABS.

The transducers 108, 109 are held proximate to a surface 110 of the magnetic recording medium 111 while reading and writing data. The media-facing surface 103 includes air-bearing features that cause the read/write head 102 to be separated from the recording surface 110 via a thin layer of air. A heater 112 is activated to adjust a clearance 114 between the transducers 108, 109 and the recording surface 110. The heater 112 causes a local protrusion 116 due to thermal expansion of material surrounding the transducers 108, 109. By controlling a current supplied to the heater 112, the clearance 114 can be actively adjusted. The clearance 114 may also be referred to as adaptive fly height (AFH) or head-to-media spacing (HMS).

A controller 118 includes logic circuits that control current supplied to the heater 112, as well controlling the as sending and receiving of signals to and from the recording head. Those signals include read and write channel data, sensor data, etc. An interface 120 conditions the signals between the controller 118 and the read/write head, performing pre-amplification, filtering, analog-to-digital conversion, digital-to-analog conversion, encoding, decoding, etc.

As noted above, the clearance 114 can be measured using HR algorithms. This may involve recording test data to the recording medium 111. The test data may be factory pre-written and/or written via the read/write head 102. The test data includes tones with at least two harmonic frequencies. The read transducer 108 reads the test tracks, and the signals are analyzed via controller 118 to estimate the clearance 114. This may be performed during factory testing of the hard drive, and may also be performed during operation of the hard drive.

Harmonic ratio measurement algorithms utilize the Wallace spacing loss equation to estimate head-to-media spacing. The Wallace equation dictates that the log of the ratio of two amplitude measurements is linear in spacing. Thus, the ratio of amplitude measurements at two different frequencies can be used to accurately measure HMS. Any gain change that is frequency independent will divide out, improving the robustness of the measurement system.

According to the Wallace equation, the change in spacing from a known reference condition can be expressed as shown in Equation [1] below, where $A_n$ and $A_m$ are the measured amplitudes of the reference pattern's $n^{th}$ and $m^{th}$ harmonic, $\lambda_1$ is the wavelength of the first harmonic, and $A_n^{ref}$ and $A_m^{ref}$ are the corresponding amplitude measurements at the reference condition. Equation [1] can be rearranged to express the harmonic ratio as a function of spacing as shown in Equation [2], where HR and $HR_{ref}$ are defined in Expressions [3] and [4].

$$\Delta S = \frac{\lambda_1}{(m-n)2\pi} \ln\left(\frac{A_n/A_m}{A_n^{ref}/A_m^{ref}}\right) \quad [1]$$

$$HR = \frac{(m-n)2\pi}{\lambda_1} \Delta S + HR_{ref} \quad [2]$$

$$HR \equiv \ln(A_n/A_m) \quad [3]$$

$$HR_{ref} \equiv \ln(A_n^{ref}/A_m^{ref}) \quad [4]$$

According to Equation [2], HR measurement fidelity is increased when a reference pattern is selected whose fundamental frequency is as high as possible, and that contains two harmonics whose frequencies are as different as possible. As the frequency of the two harmonics approach one another, the sensitivity of the measurement to spacing changes decreases. This motivates the selection of a reference pattern containing a very high high-frequency (HF) harmonic, and a very low low-frequency (LF) harmonic. Frequency ratios of 3:1 are typical, and ratios of at least 4:1 are highly desirable.

There are several challenges when using a reference pattern that contains strong, highly-separated harmonics. Primary among those challenges are the effects of thermal decay. In perpendicular media, LF transitions decay thermally at a faster rate than HF transitions. As the LF harmonic is pushed to lower frequency in an attempt to increase the frequency separation between LF and HF, the more it will decay thermally. Because this decay is frequency-dependent, it does not divide out when the HR is calculated. It is therefore misinterpreted as a clearance change and reduces the accuracy of the system.

Figure 2:
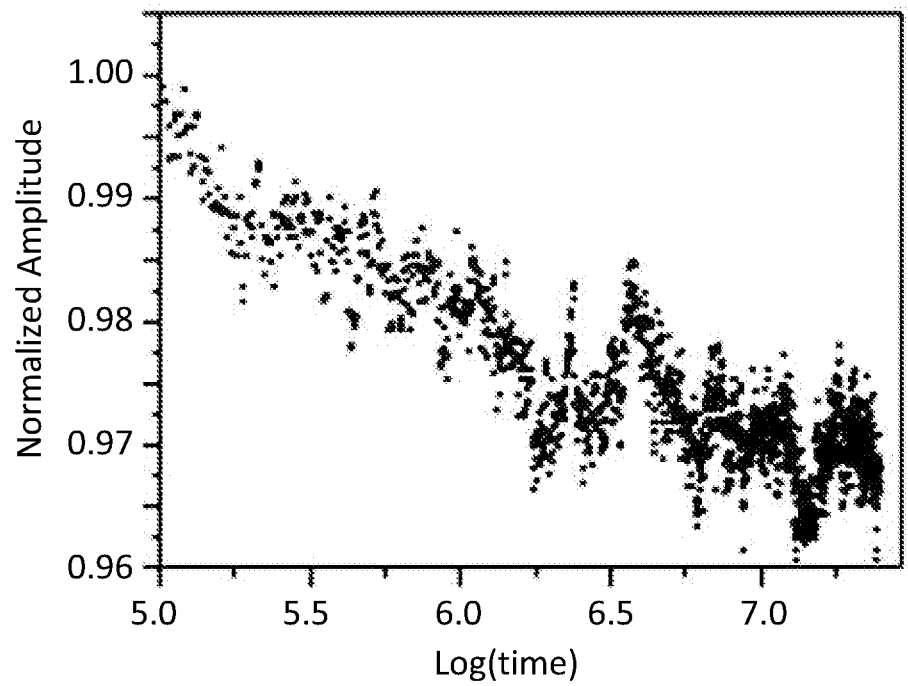
FIG. 2 is a graph illustrating thermal decay affecting a test pattern on perpendicular media according to an example embodiment.

In FIG. 2, a graph illustrates an example of thermal decay affecting a test pattern on perpendicular media according to an example embodiment. In this example, the normalized amplitude is of an 8T tone, which would be used as an LF harmonic with a HF tone of 2T and 4:1 frequency ratio. The HF tone is 2T in this example to minimize sampling errors. If a 4:1 frequency ratio is desired, then that puts the LF tone at 8T. As seen in the graph, the 8T test pattern loses almost 4% of amplitude over a few hours. This level of decay is not tolerable in applications that must maintain angstrom level accuracy.

Another significant challenge in the selection of a reference pattern is the natural decrease in amplitude as the HF harmonic frequency is increased. The difference in amplitude between the LF and HF harmonics for some reference patterns can be in the 20-50 dB range. Resolving the HF harmonic with adequate fidelity requires high gain, but the large amplitude difference between the two frequencies limits the maximum gain that can be used without saturating an analog-to-digital converter (ADC).

In some implementations, HR reference patterns have been pure tone patterns with a fundamental frequency that is low enough to induce strong odd harmonics. For example, a 6T pattern (111111000000) was a common choice. But it is subject to both difficulties outlined above regarding thermal decay and amplitude difference between HF and LF harmonics (described in greater detail below). Another solution is to choose a mixed pattern that increases the HF content to decrease the amplitude difference between HF and LF harmonics. However, as we will show below, this solution turns out to be inadequate for solving the problems outlined above.

Figure 3:
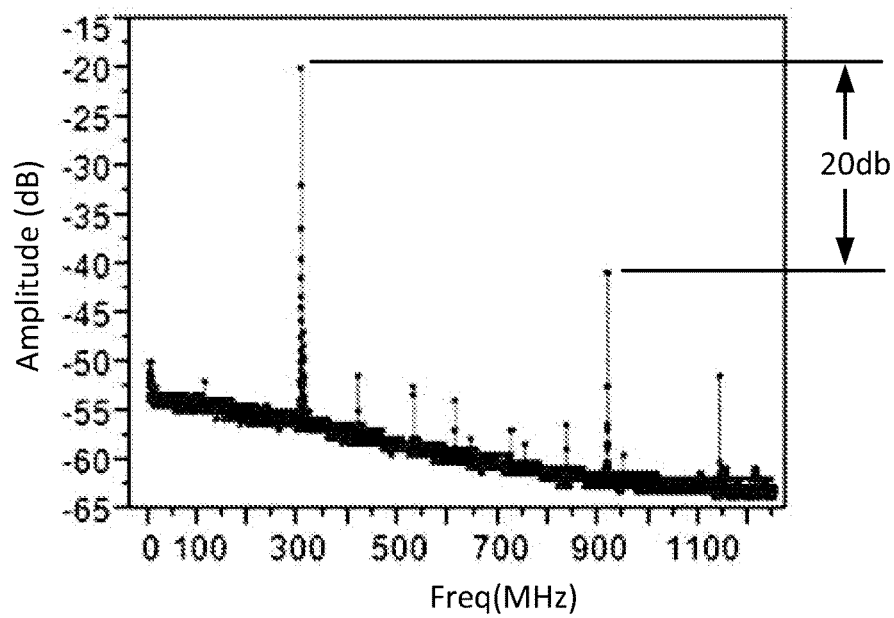
FIG. 3 is a graph illustrating a spectra of a mixed test pattern on perpendicular media according to an example embodiment.

In FIG. 3, a graph illustrates a spectra of a mixed test pattern on perpendicular media according to an example embodiment. Mixed patterns combine low and high frequency transitions. They may contain more HF transitions than LF in attempt to decrease the amplitude difference between the two tones. But given the natural recording physics, HF transitions have intrinsically lower amplitude, so no matter how the HF content a given mixed pattern is increased, the LF/HF amplitude ratio is still large. In the example of FIG. 3, the spectrum is of a 0xA5 mixed pattern (10100101). It contains a mix of 1 and 2T transitions, and has harmonics 4T and 1.33T harmonic. As indicated in the graph, the HF tone is 20 dB lower amplitude than the LF one. Table 1 below shows 4T/1.33 amplitude ratios for the mixed 0xA5 pattern as well as a pure 4T (11110000) and mixed 0x9C (10011100) patterns. The amplitudes were measured in the passive state (ie, with the heater 112 shut off) as in that state the HF tone will be the hardest to resolve. All of these patterns exhibit 4T, 2T and 1.33T tones, and are designed to increase the 1.33T content thereby decreasing HR.

TABLE 1

| Pattern | Signal Amplitude (dBm) | | | 4T/1.33T Amplitude ratio | |
|---------|------|------|------|------|------|
|  | 4T | 2T | 1.33T | dB | Linear |
| 0xA5 | −20.0 | −53.9 | −40.7 | 20.7 | 10.8 |
| 0x9C | −16.2 | −25.6 | −47.6 | 31.4 | 37.0 |
| 4T | −10.6 | −42.0 | −44.5 | 33.9 | 49.5 |

The amplitude measurements should use the full output range of the ADC without saturation. The maximum gain is therefore dictated by the highest amplitude tone. When the LF/HF amplitude ratio is large, the ability to accurately resolve the HF tone is diminished. For example, given an ADC of m-bits of resolution, and the need to keep the gain low enough that the LF is no more than x % of the ADC's full input range, the peak-to-peak amplitude of the HF signal measured in ADC bits is shown in Expression [5] below, where $HR_{dB}$ is the LF/HF ratio in dB. For a 6-bit ADC, where x=70%, and $HR_{dB}$=25 dB (which is seen in many mixed patterns), the HF signal is a low-resolution 2.5 bits in peak-to-peak amplitude. In contrast, a near unity HR (0 dB) is ideal. In such a case, both the HF and LF could use nearly the full 6-bits to resolve peak-to-peak amplitude.

$$HF_{bits} = \frac{x \cdot 2^m}{10^{\frac{HR_{dB}}{20}}} \quad [5]$$

In embodiments described herein, a reference pattern is used that includes a first, pure high-frequency tone portion with a smaller second portion having at least one higher-frequency half cycle. For example, the pure high-frequency tone may have a length that is 60% to 90% the length of the reference pattern. The pure tone portion may include a 2T tone and the second portion may include at least ½ of a 1T cycle. Lower-order subharmonics are introduced by tailoring the length over which the pattern repeats with the addition of higher-frequency cycles. In this way, the "fundamental" harmonic is the high-frequency, pure tone and it is the content of the pure tone that dominates the overall signal strength. In addition, there are no low frequency transitions written on the disk and therefore the effects of thermal decay are greatly mitigated.

The channel write frequency can be adjusted separately from the read allowing for fractional T patterns if desired.

For example, if a pattern containing a 2T fundamental is written after increasing the native channel frequency by a fraction of 4/3, and then then read back at the native frequency, the 2T tone would effectively shift to 1.5T (which is impossible to write natively). According to Equation [2], doing so would increase the sensitivity of HR to spacing. Similarly if the written pattern contained an 8T subharmonic, that tone would shift to 6T when read at the native frequency. In such a case, the 1T transitions written to induce the 8T harmonic would be have a transition length of 0.75T when read natively. Alternatively, the channel frequency can also be lowered during the write further increasing the combinations of frequencies that can be induced when reading.

Figure 4:
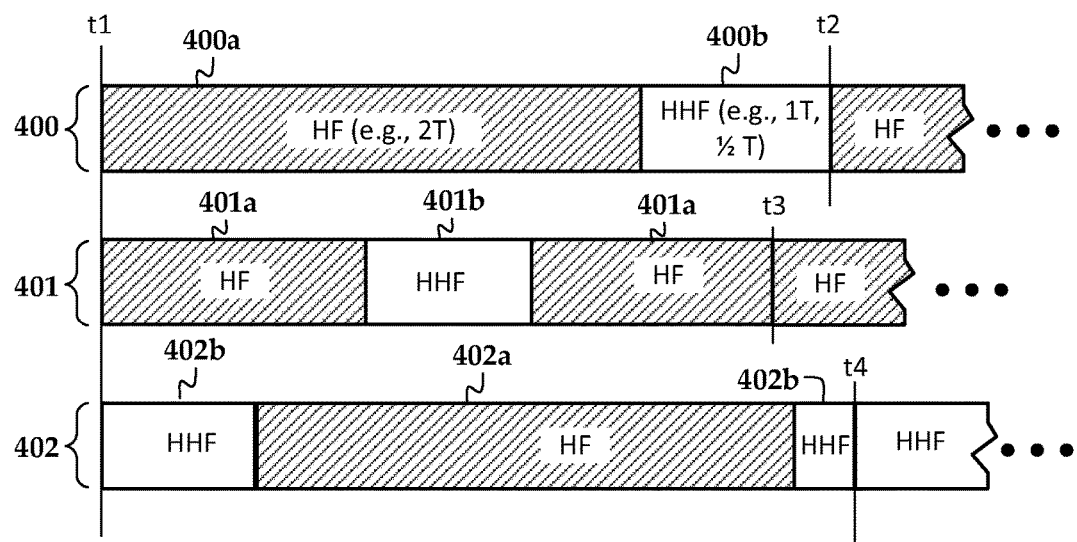
FIG. 4 is a block diagram of repeating reference patterns according to example embodiments.

In FIG. 4, a block diagram illustrates examples of repeating reference patterns 400-402 according to example embodiments. Each of the patterns 400-402 include one or more HF pure-tone portions 400a-402a, and one higher-HF (HHF) portion 400b-402b. The HHF 400b-402b portions may be higher frequency pure tones, or may be a mixed tone with both higher and lower frequencies than that of the HF portions 400a-402a. As indicated by the ellipses, all of the reference patterns 400-402 repeat, although may have different lengths, as indicated by ending times t2-t4. In order to reduce sampling errors, the HF 400a, 401a, 402a portions in these examples are 2T tones. As such, the HHF portions 400b, 401b, 402b may include half or full 1T signals.

Figure 5:
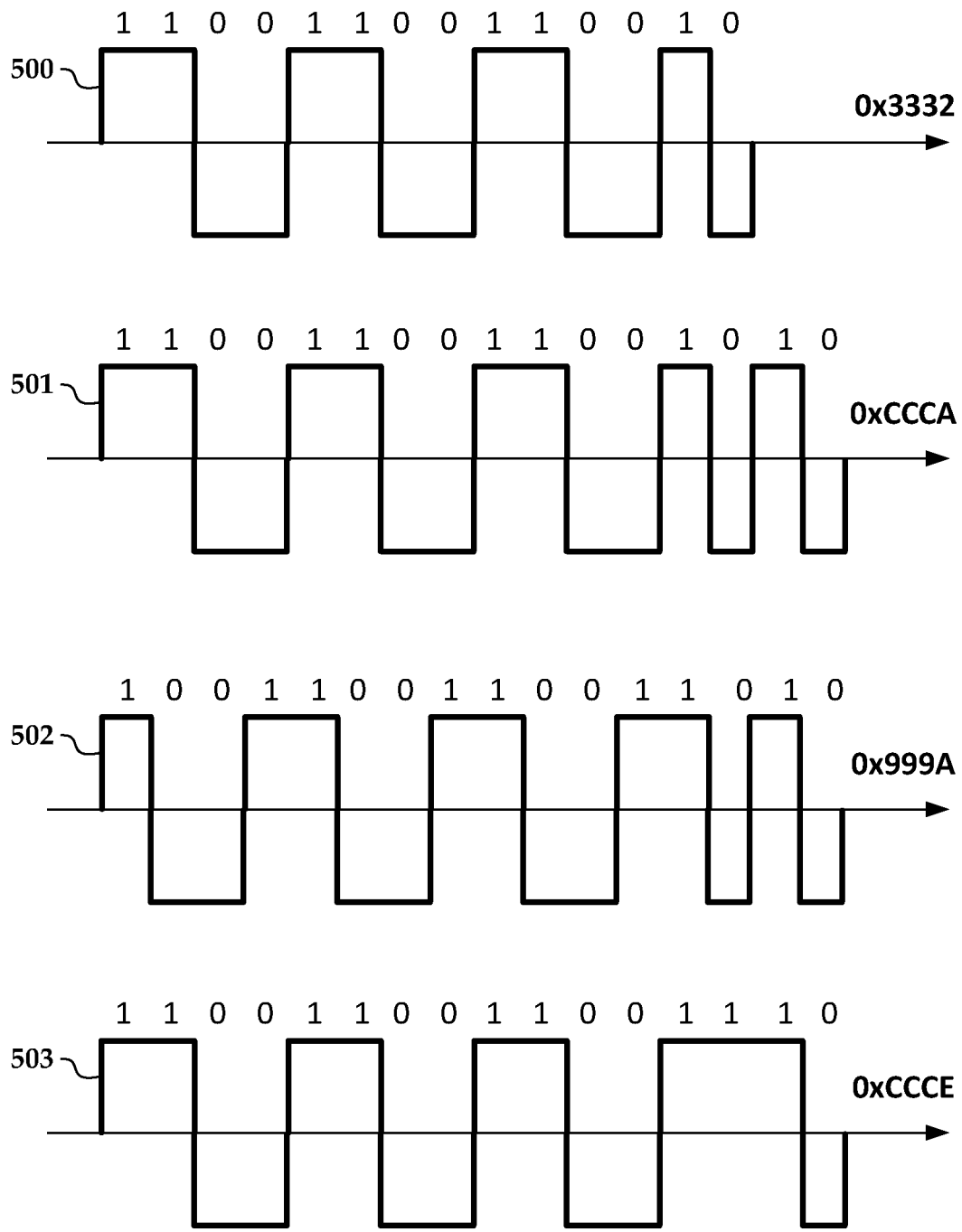
FIG. 5 is a set of signal diagrams illustrating specific repeating reference patterns according to example embodiments.

In FIG. 5, signal diagrams illustrate specific repeating reference patterns 500-503 according to example embodiments. A test track can include repetitions of one of these reference patterns 500-503. For example, a test track can be written that encompasses all of the user data sectors between two servo marks. The test track may be written by a separate device (e.g., a multi-disk writer) or may be written by the same read/write head that reads the test tracks.

Reference pattern 500 is a 0x3332 pattern, which includes a high-frequency, pure tone portion with three cycles of 2T and a higher-frequency portion with one cycle of 1T (11001100110010). For this pattern 500, harmonics are at multiples of fn/7, where fn is the ADC sampling Nyquist frequency. The length (measured in bits) of the pure tone portion is about 86% ($12/14$) of the length of full reference pattern 500. In this case, the frequency ratio would be 3.5:1.

Reference pattern 501 is a 0xCCCA pattern, which includes a high-frequency, pure tone portion with three cycles of 2T and a higher-frequency portion with two cycles of 1T (1100110011001010). For this pattern 501, harmonics are at multiples of fn/8, and the pure tone portion makes up 75% ($12/16$) of the full pattern by length. Reference pattern 502 (0x999A pattern) is a permutation of the 0xCCCA pattern 501.

Reference pattern 503 is a 0xCCCE pattern, which includes a high-frequency, pure tone portion with three cycles of 2T and a higher-frequency portion with one-half cycle of 3T and one-half cycle of 1T (1100110011001110). In this embodiment, we tailor the length over which the pattern repeats using a half cycle of a lower frequency tone. Such a pattern can be used to increase the LF amplitude, and is suitable to use with media designs for which 3T thermal decay is acceptable. For this reference pattern 503, harmonics are also at multiples of fn/8, and the pure tone portion makes up 75% ($12/16$) of the full pattern by length.

Figure 6:
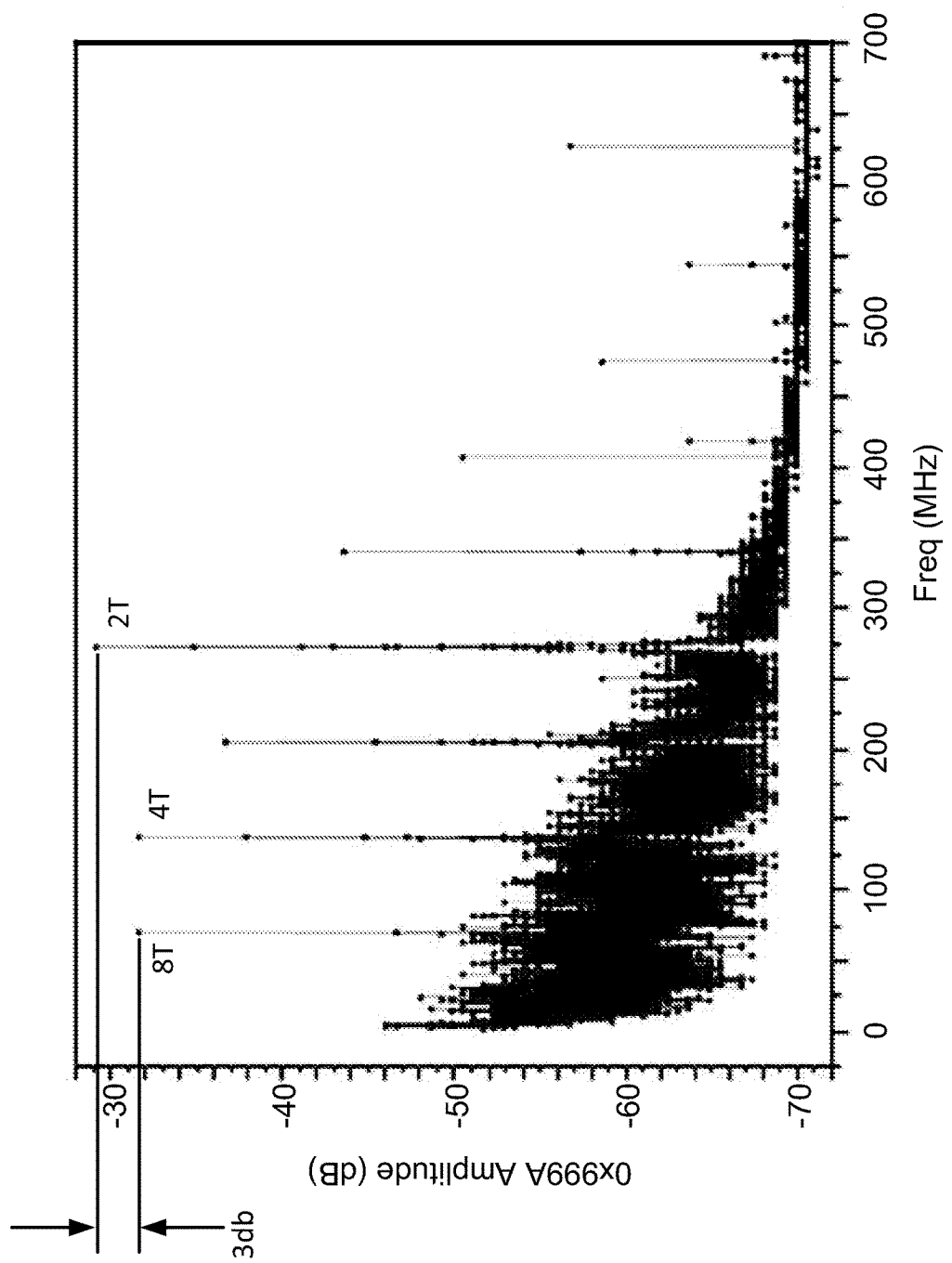
FIG. 6 is a graph showing spectra for a 0x999A pattern according to an example embodiment.

By tailoring the track length over which these almost pure tone 2T patterns repeat, sub harmonics are introduced at fractions of the pure tone frequency. In FIG. 6, a graph shows spectra for a 0x999A pattern test track according to an example embodiment. Here the LF (8T) tone is lower in amplitude than the HF tone (2T). This gives a 4:1 frequency ratio without any LF transitions on the disk and a negative HR (in dB), solving both the ADC resolution and thermal decay problems outlined above.

Figure 7:
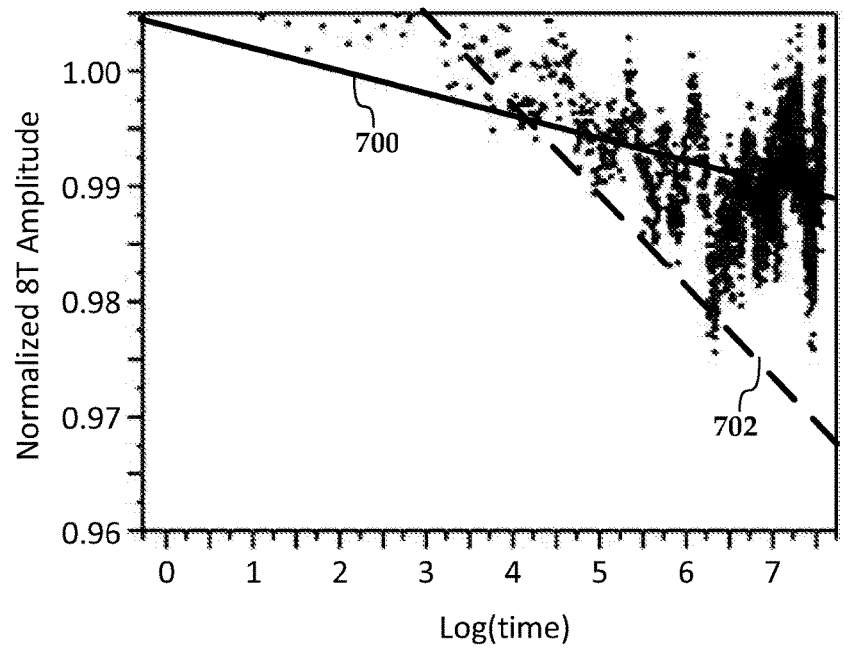
FIG. 7 is a graph showing reduction in thermal decay in a 0x999A pattern according to an example embodiment.

In FIG. 7, a graph shows reduction in thermal decay seen in a 0x999A pattern according to an example embodiment. Line 700 represents a linear curve fit of the amplitude data over time for the 8T component of the 0x999A. Line 702 represents a linear fit of the pure 8T tone data shown in FIG. 2 over the same time period. The thermal decay of the 8T harmonic of the 0x999A pattern is 75% less than that of the 8T pure tone. Thus the use of the 0x999A pattern (as well as other primarily HF patterns described herein) significantly mitigates the effects of thermal decay compared to a LF pattern on a same or similar recording medium.

Figure 8:
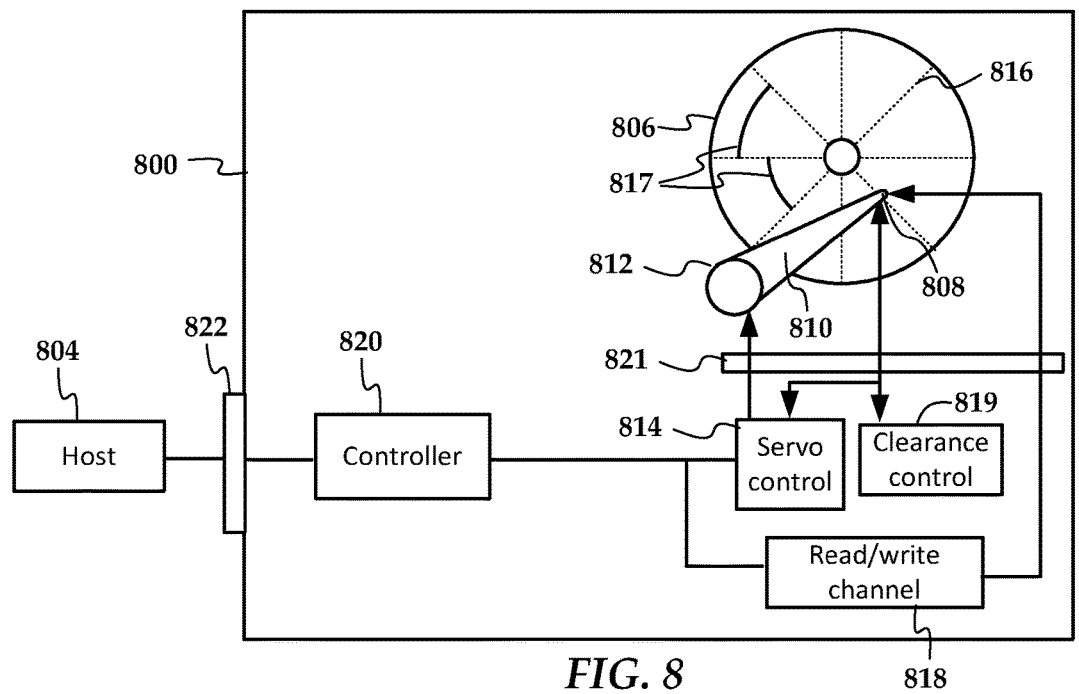
FIG. 8 is a block diagram of an apparatus according to an example embodiment.

Test tracks as described above can be used for measuring clearances of read/write heads in hard disk drive apparatuses. The measurement of clearance using these test patterns may be part of initial device calibration, and may also be used in active fly height control for such devices. The block diagram in FIG. 8 shows a disk drive apparatus according to an example embodiment. The hard drive 800 includes one or more magnetic disks 806 used as a recording medium. One or more read/write heads 808 are mounted to one or more arms 810 that are driven together radially via a voice coil motor 812 and optionally via a microactuator (not shown) that can drive each read/write head 808 independently. There may be one read/write head 808 dedicated to each surface of the disks 806. A servo controller 814 reads servo marks 816 on the disk 806 via the read/write heads 808. The servo marks 816 facilitate locating where (e.g., which track and sector) the read/write heads 808 are located.

Test tracks 817 may be written to the disk via an external device (e.g., a multi-disk writer) and/or via the read/write heads 808. In this example, the test tracks 817 extend between servo marks 816, although test may be shorter or longer in other embodiments. The test tracks 817 include repeated patterns each having a first portion made up of a pure high-frequency tone and a second portion having at least one higher frequency component. The first portion is longer than the second portion, e.g., 60%, 75%, 87%, etc. When read by the read/write heads 808, the test tracks 817 detect a harmonic frequency corresponding to the pure tone portion and a subharmonic that is a fraction of the frequency. The harmonic and subharmonic can be used to measure a clearance between the read/write heads 808 and the disk 806.

A clearance control module 819 is operable (e.g., via system controller 820) to read the test tracks 817 and measure the harmonics and subharmonics, e.g., by transforming sampled data from a time domain to a frequency domain. Amplitude differences between the harmonics and subharmonics can be used to determine a head-to-disk clearance using the Wallace spacing equation as noted above. The measurement of head-to-disk clearance may be used for initial and/or subsequent fly-height calibration, e.g., setting values used in open-loop control of the clearance. In other embodiments, the measurement of head-to-disk clearance may be used as an input to a closed loop controller.

A read/write channel 818 at least encodes and decodes data written to the disks 816, and may provide other functions, e.g., error correction, timing adjustment, analog-to-digital conversion, digital-to-analog conversion, etc. Interface circuitry 821 facilitates communications between the read/write channel 818 and the read/write heads 808. Such circuitry 821 may include, but is not limited to preamplifiers, amplifiers, filters, etc.

System controller 820 provides system-level control of operations of the hard drive device 800, including servo control and processing data streams via the read/write channel 818. The controller 820 may facilitate operations of other components not shown, such as sub-processors, read/write channels 818, disk motor control, power distribution, etc. The hard drive apparatus 800 includes a host interface 822 for communicating with external devices, as represented by host 804. The host 804 makes request for data storage and retrieval via the host interface 822, the requests being processed via the controller 820.

Figure 9:
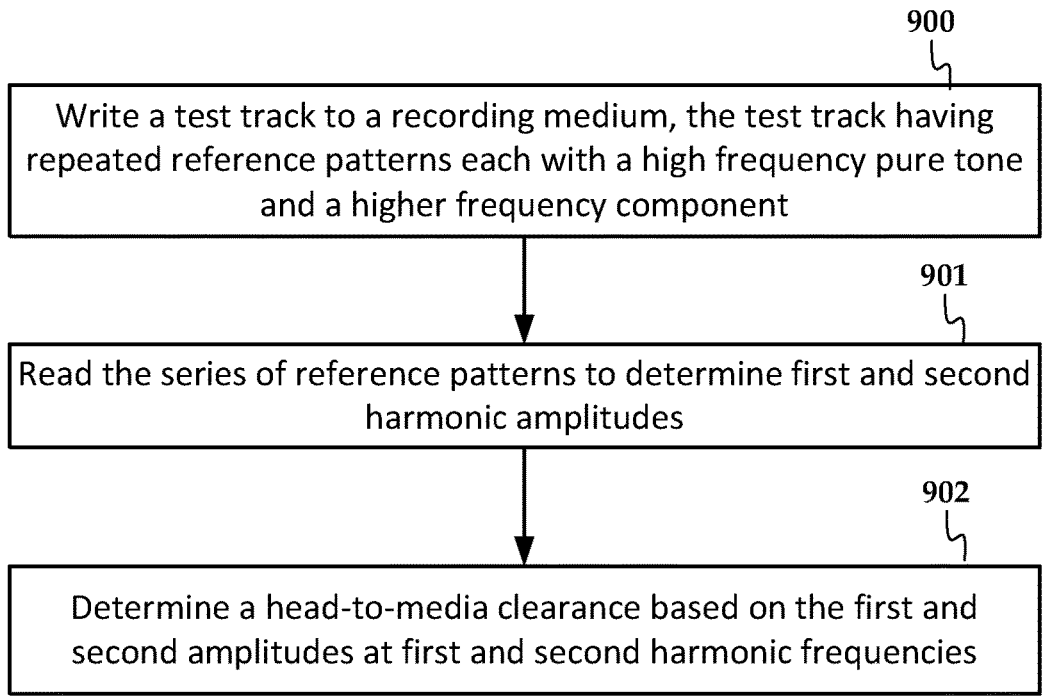
FIGS. 9 and 10 are flowcharts of methods according to example embodiments.

In FIG. 9, a flowchart shows a method according to an example embodiment. The method involves writing 900 a test track to a recording medium. The test track includes a repeated series of reference patterns. The reference patterns each include a first portion with a high frequency pure tone and a second portion with a higher frequency component. A length of the first portion being greater than a length of the second portion. The series of reference patterns are read 901 to determine first and second harmonic amplitudes. A head-to-media clearance is determined 902 based on the first and second amplitudes at first and second harmonic frequencies.

Figure 10:
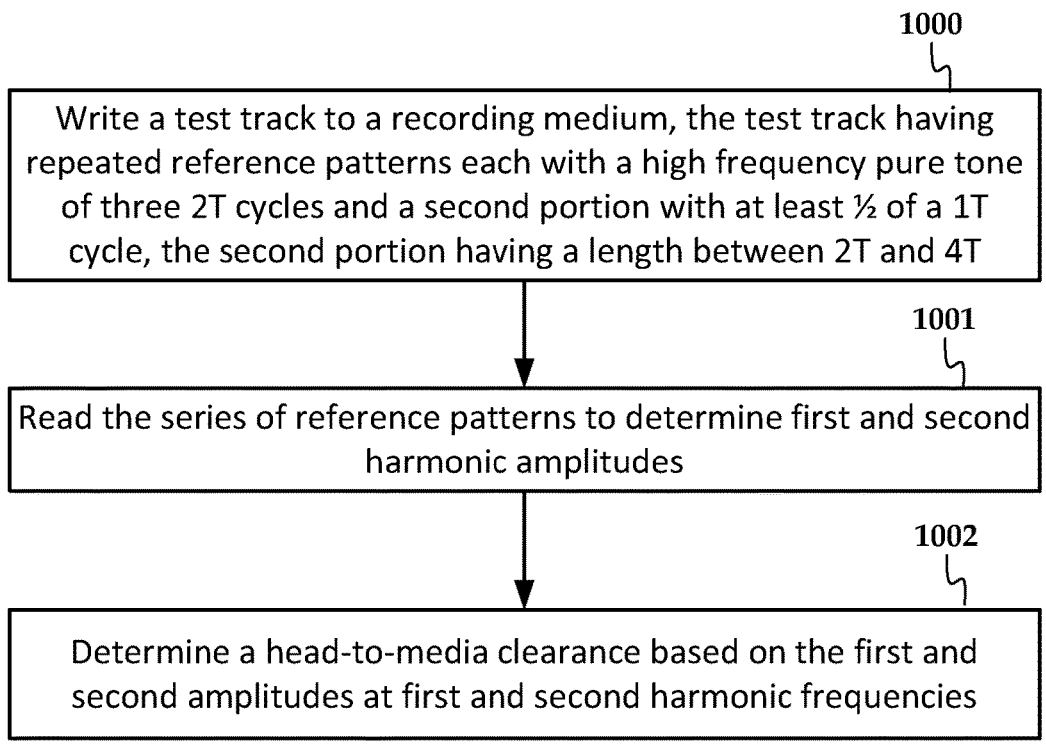

In FIG. 10, a flowchart shows a method according to another example embodiment. The method involves writing 1000 a test track to a recording medium. The test track includes a repeated series of reference patterns. The reference patterns each include a high frequency pure tone with three 2T cycles and a second portion comprising at least ½ of a 1T cycle, the second portion having a length between 2T and 4T. The series of reference patterns are read 1001 to determine first and second harmonic amplitudes. A head-to-media clearance is determined 1002 based on the first and second amplitudes at first and second harmonic frequencies.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    writing a test track to a recording medium, the test track comprising a repeated series of reference patterns, the reference patterns each comprising a first portion with at least one full cycle of a high frequency pure tone and a second portion comprising a higher frequency component, a length of the first portion being greater than a length of the second portion;
    reading the series of reference patterns to determine first and second harmonic amplitudes; and
    determining a head-to-media clearance based on the first and second amplitudes at first and second harmonic frequencies.

2. The method of claim 1, wherein the high frequency pure tone comprises a 2T tone.

3. The method of claim 1, wherein the higher-frequency component comprises at least ½ of a 1T cycle.

4. The method of claim 1, wherein the higher-frequency component comprise at least one 1T cycle.

5. The method of claim 4, wherein the higher-frequency component comprises two 1T cycles.

6. The method of claim 1, wherein the higher-frequency component comprises a ½ 1T cycle and a ½ 3T cycle.

7. The method of claim 1, wherein a frequency ratio between the first and second harmonic frequencies is 4:1.

8. The method of claim 1, wherein the test track fully extends between two servo marks.

9. The method of claim 1, wherein the length the first portion is at least 75% of a length of the reference pattern.

10. A method, comprising:
    writing a test track to a recording medium, the test track comprising a repeated series of reference patterns, each of the reference pattern comprising a high frequency pure tone with three 2T cycles and a second portion comprising at least ½ of a 1T cycle, the second portion having a length between 2T and 4T;
    reading the series of reference patterns to determine first and second harmonic amplitudes, and
    determining a head-to-media clearance based on the first and second amplitudes at first and second harmonic frequencies.

11. The method of claim 10, wherein the second portion comprise at least one 1T cycle.

12. The method of claim 11, wherein the second portion comprises two 1T cycles.

13. The method of claim 1, wherein the second portion comprises a ½ 1T cycle and a ½ 3T cycle.

14. An apparatus, comprising:
    a read/write channel configured to communicate with a read/write head that reads from and writes to a magnetic recording medium; and
    a controller coupled to the read/write channel and configured to:
        write a test track to the recording medium, the test track comprising a repeated series of reference patterns, the reference patterns each comprising a first portion with at least one full cycle of a high frequency pure tone and a second portion comprising a higher frequency component, a length of the first portion being greater than a length of the second portion;
        read the series of reference patterns to determine first and second harmonic amplitudes; and
        determine a clearance between the read/write head and the recording media based on the first and second amplitudes at first and second harmonic frequencies.

15. The apparatus of claim 14, wherein the high frequency pure tone comprises a 2T tone.

16. The apparatus of claim 14, wherein the higher-frequency component comprises at least ½ of a 1T cycle.

17. The apparatus of claim 14, wherein the higher-frequency component comprise at least one 1T cycle.

18. The apparatus of claim 14, wherein the higher-frequency component comprises a ½ 1T cycle and a ½ 3T cycle.

19. The apparatus of claim 14, wherein a frequency ratio between the first and second harmonic frequencies is 4:1.

20. The apparatus of claim 14, wherein the length the first portion is at least 75% of a length of the reference pattern.

* * * * *